United States Patent [19]
Valentine

[11] Patent Number: 6,112,090
[45] Date of Patent: Aug. 29, 2000

[54] SYSTEM AND METHOD FOR FORWARDING CALLING PARTY INFORMATION

[75] Inventor: Eric Valentine, Plano, Tex.

[73] Assignee: Ericsson Inc., Research Triangle Park, N.C.

[21] Appl. No.: 08/931,625

[22] Filed: Sep. 16, 1997

[51] Int. Cl.7 ............................................ H04B 1/00
[52] U.S. Cl. .................................. 455/445; 455/415
[58] Field of Search ............................ 455/433, 435, 455/445, 415, 414

[56] References Cited

U.S. PATENT DOCUMENTS

| | | | |
|---|---|---|---|
| 5,506,888 | 4/1996 | Hayes et al. | 379/59 |
| 5,774,806 | 6/1998 | Tayloe et al. | 455/427 |
| 5,884,170 | 3/1999 | Valentine et al. | 455/433 |
| 5,930,701 | 7/1999 | Skog | 455/415 |

FOREIGN PATENT DOCUMENTS

| | | |
|---|---|---|
| 0 503 813 A2 | 2/1992 | European Pat. Off. . |
| 2 253 972 | 9/1992 | United Kingdom . |
| WO 97/01252 | 9/1997 | WIPO . |
| 99/09760 | 2/1999 | WIPO ............................ H04Q 7/00 |
| 99/20065 | 4/1999 | WIPO ............................ H04Q 7/22 |

OTHER PUBLICATIONS

PCT International Serach Report dated Dec. 30, 1998.

*Primary Examiner*—Reinhard J. Eisenzopf
*Assistant Examiner*—Makoto Aoki
*Attorney, Agent, or Firm*—Jenkens & Gilchrist

[57] ABSTRACT

An improved system and method for high penetration notification is disclosed. Whereas conventional telecommunications systems invoke wireline trunking resources to transfer calling number information to the transmitter for wireless transmission to a called subscriber, the system and method of the present invention avoids allocation of the trunking resources by incorporating the calling number information into existing non-trunked information transference protocols.

27 Claims, 3 Drawing Sheets

SYSTEM AND METHOD FOR FORWARDING CALLING PARTY INFORMATION

BACKGROUND OF THE INVENTION

1. Technical Field of the Invention

The present invention relates to mobile cellular telephone communications systems and, in particular, to a system and method for forwarding calling party information to a mobile terminal user without invoking a trunked connection.

2. Description of Related Art

Historically, paging systems and mobile telephone systems have provided service to a limited geographic area using a relatively high-powered centralized transmitting site. This arrangement has worked well in small cities and municipalities, but has often proved unsuitable for large metropolitan areas. To adequately serve a large geographic area, cellular phone systems began to simulcast (transmit the same signals at substantially the same time) from several transmitters strategically positioned to provide wide-area coverage. In such systems, a pager or a mobile station could receive information anywhere in the specified wide area.

Today, the trend in wireless communications is to provide even greater geographic coverage. Nationwide communication systems are often contemplated in an attempt to provide communication services to customers without regard to where they are in the United States, or for that matter, in the world. One known communication system employs satellites to transmit paging messages to pagers as well as cellular mobile stations.

It is well known that, in ground-based cellular communication systems or satellite-based communication systems, signal path interference can block a signal and prevent it from reaching the specified receiver. Such signal path interference of this type is often due to structural blockage from thick foliage, buildings and the like. Generally speaking, the signal path interference results in a mobile station being in an operational mode but also being temporarily unable to communicate with a transceiver.

Many methods and systems have been proposed for ground-based as well as satellite-based communication systems in response to the problem of mobile station unavailability for message delivery due to signal path interference as set forth in U.S. patent application Ser. No. 08/719,282, entitled "Subscriber Feature Controlled High Penetration Messaging", filed Sep. 24, 1996, of which applicant is a co-inventor. One proposed system includes a store in a mobile switching center for storing a message until the presence of the mobile station is detected through a registration, at which point the message is delivered or made available for retrieval. A drawback to this approach, however, is that the delivery of important messages may be unacceptably delayed until the mobile station clears the signal interference and re-registers within a cell area. Another drawback is that there are no further attempts by the mobile switching center transceiver to communicate with the mobile station and deliver the potentially important message until re-registration occurs.

Another proposed solution to the problem of mobile station unavailability owing to signal path interference is to increase the transmission power level within a "standard" range of power levels. Increasing the power level within a standard range, however, may not be sufficient to overcome the signal interference due to structural path blockage. Moreover, current proposals for increasing transmission power include increasing power either on a system wide basis or on a cell wide basis. Under these proposals, unnecessary power levels are utilized for transmission to mobile stations which are receiving signals clearly in order to reach those mobile stations that are not receiving signals clearly.

In proposed satellite-based communications systems, a mobile station located toward the center of a building or under a large oak tree with thick or wet foliage may be subject to signal path interference and may not be able to receive and respond to a message delivery attempt or to a paging attempt from a satellite-based transceiver. With satellites, the solution of transmitting at increased power levels is not always possible because many satellites have fixed transmission power level capabilities. While some satellites can exceed the standard transmission power levels to attempt to deliver a message, or to page a mobile station, other satellites have no capability of transmitting at increased power levels. Thus, a given satellite serving the mobile station may not be capable of performing a high power level transmission to overcome signal path interference.

Even for those scenarios in which it is possible to exceed standard transmission power levels, economic disincentives exist for doing so. It is likely that only some users will be interested in selectively using a higher power transmission level service. Other users simply may not care about becoming more "reachable". It would be unfair for the expenses of increased power transmission levels to be borne by all mobile station users. Thus, even if a satellite-based transceiver has the capability to transmit a message at an increased power level, the increased power level should not be provided to those users that would not ordinarily need or appreciate such a service feature.

Timing problems also exist with using satellite-based transceivers for increased power transmissions to a ground-based receiver. First, in order to avoid unnecessary transmissions at high power levels, increased power level transmissions should only be made after a transmission at a standard power level fails. Second, in a typical communication system, namely one in which high penetration power level transmissions do not occur, a paging system may designate that a user is unavailable after a mobile station fails to respond to at least one page attempt. In conventional systems, certain time out values are established which only account for the amount of time required to page a mobile station at a standard power level. Conventional systems are set up wherein an originating source of a message rebroadcasts its message to initiate paging once a time out value is reached. Unfortunately, such timeout values are frequently less than the time required for the communication system to initiate and process a second paging attempt or a third paging attempt at higher power levels.

In view of the aforedescribed difficulties, assignee developed a system and method for reducing unnecessary broadcast or paging attempts, as set forth in more detail in said co-pending patent application, where the link margins or effective signal strength of a transmission may be inadequate for the mobile station or terminal to "hear" a page request. Through a high penetration notification (HPN) message, however, the terminal may be able to hear the page request at a higher power level. The page request may contain information, such as part of a Short Message, the Calling Party Number for terminating calls, etc. Receipt of such a notification informs the mobile terminal user of the attempt to communicate, and that, if they move into better radio coverage, the short message can be re-sent or they can call back the caller.

One problem with the aforedescribed HPN technique, however, is that elaborate system services are invoked whether or not the called mobile terminal user is attached to the cellular-based or satellite-based network. In particular, in the HPN system of the co-pending patent application, a mobile switching center (MSC) in the cellular network, when asked to provide a roaming number (identification), may override a detach marking associated with a particular user and return a roaming number anyway, e.g., the last number used by that subscriber. One consequence of this overriding, however, as discussed in more detail hereinafter, is that triggering of supplementary services for unavailable subscribers is suppressed in the MSC and seizure of a trunkline occurs for the purpose of delivering the calling party identity, an event wholly unnecessary when the called party is detached from the system.

It is, accordingly, a first object of the present invention to eliminate such unnecessary system actions.

It is also an object of the present invention to provide a system and method for improved high penetration notification for use in both terrestrially-based and satellite-based systems.

SUMMARY OF THE INVENTION

The present invention is directed to an improved system and method for high penetration notification. Particularly, whereas conventional telecommunications systems invoke wireline trunking resources to transfer calling number information to the transmitter for wireless transmission to a called subscriber, the system and method of the present invention avoids allocation of the trunking resources by incorporating the calling number information into existing non-trunked information transference protocols.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
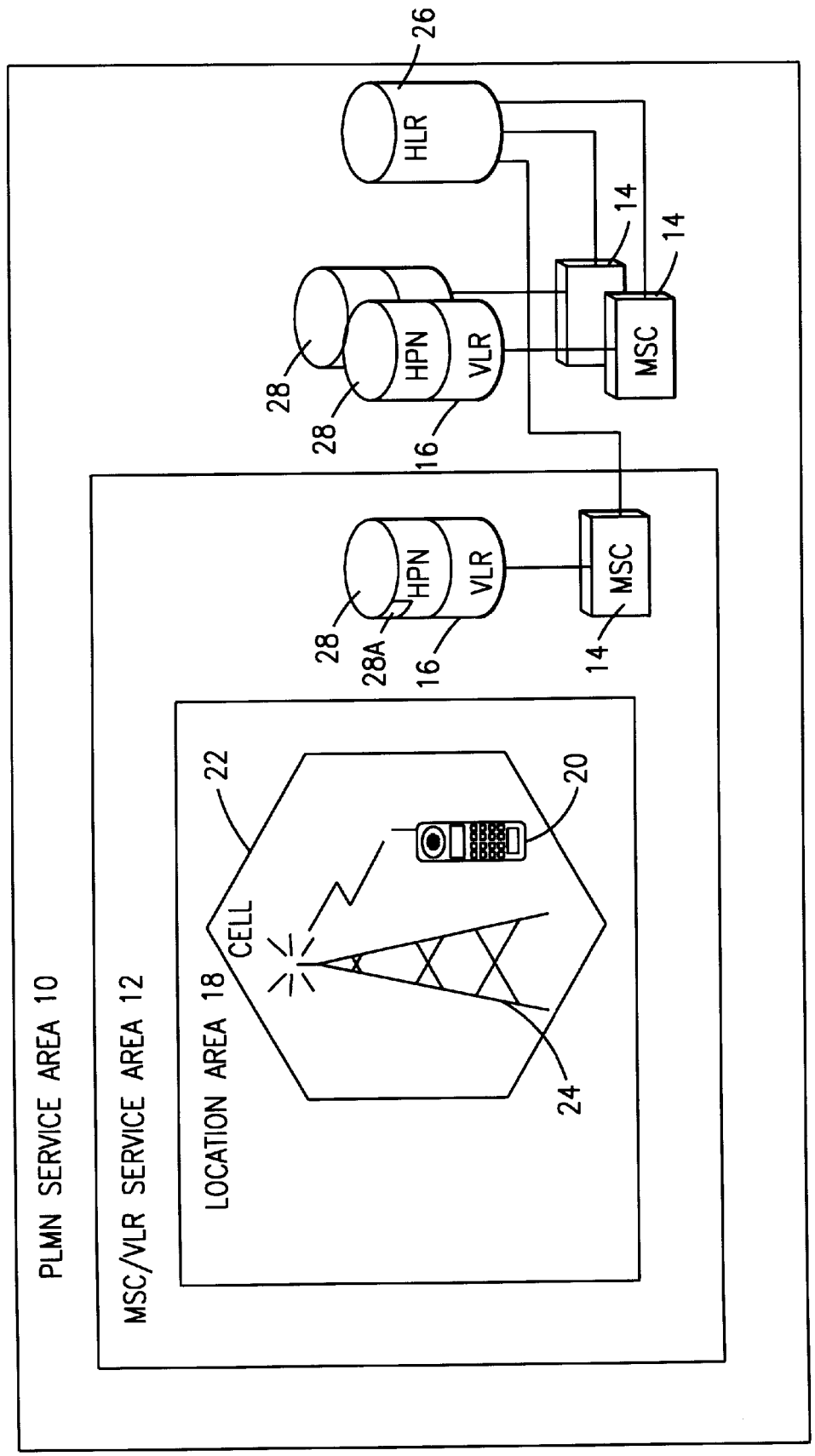
FIG. 1 is a block diagram of a cellular communications network system such as may be employed in the present invention, including high penetration notification capability therein.

With reference to FIG. 1 of the drawings, there is illustrated a terrestrially-based telecommunication system which may be used in implementing the improved high penetration notification techniques of the present invention. In particular, FIG. 1 shows a Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which is defined as that part of a given MSC/VLR area 12 in which a mobile station (MS) 20 may move freely without having to send update location information to the MSC/VLR area 12 that controls that LA 18. Each Location Area 12 is divided into a number of cells 22. Mobile Station 20 is the physical equipment, e.g., a car phone or other portable phone, used by mobile subscribers to communicate with the cellular network 10. A Base Station (BS) 24 is the physical equipment, illustrated for simplicity as a radio tower, that provides radio coverage to the geographical area of the cell 22 in which to handle radio traffic to and from the MS 20.

With further reference to FIG. 1, the PLMN Service Area or cellular network 10 includes a Home Location Register (HLR) 26, which is a database maintaining all subscriber information, e.g., user profiles, current location and routing information, International Mobile Subscriber Identity (IMSI) numbers, and other administrative information. The HLR 26 may be co-located with a given MSC 14, an integral part of the MSC 14 or service multiple MSCs 14, the latter of which is illustrated in FIG. 1. IMSI is a unique 15-digit identification number assigned to each mobile station 20, and includes a Mobile Country Code (MCC) of three digits, a Mobile Network Code (MNC) of two (or three) digits, and a Mobile Subscriber Identification Number (MSIN), the latter two constituting a National Mobile Subscriber Identity (NMSI) number.

The VLR 16 is a database containing information about all of the mobile stations 20 currently located within the MSC/VLR area 12. If a mobile station 20 roams into a new MSC/VLR area 12, the VLR 16 connected to that MSC 14 will request data about that mobile station 20 from the HLR database 26 (simultaneously informing the HLR 26 about the current location of the mobile station 20). Accordingly, if the user of the mobile station 20 then wants to make a call, the local VLR 16 will have the requisite identification information without having to reinterrogate the HLR 26. In the aforedescribed manner, the VLR and HLR databases 16 and 26, respectively, contain various subscriber information associated with a given mobile station 20.

In a first embodiment of the present invention, the MSC 14 (and associated VLR 16) includes a high penetration notification (HPN) node 28 in communication therewith for regulating high penetration notification mode communications with the mobile terminals 20, as described in said co-pending patent application. It should be understood that the HPN node 28 could alternatively be located external to the MSC 14/VLR 16 or be coupled thereto by a line (not shown). The HPN node 28 contains memory 28A therein for storing information about the high penetration notification mode capabilities of various base stations 24 that may be employed in transmitting the high penetration notification mode commands and other information, such as set forth in the co-pending patent application, incorporated herein by reference.

Figure 2:
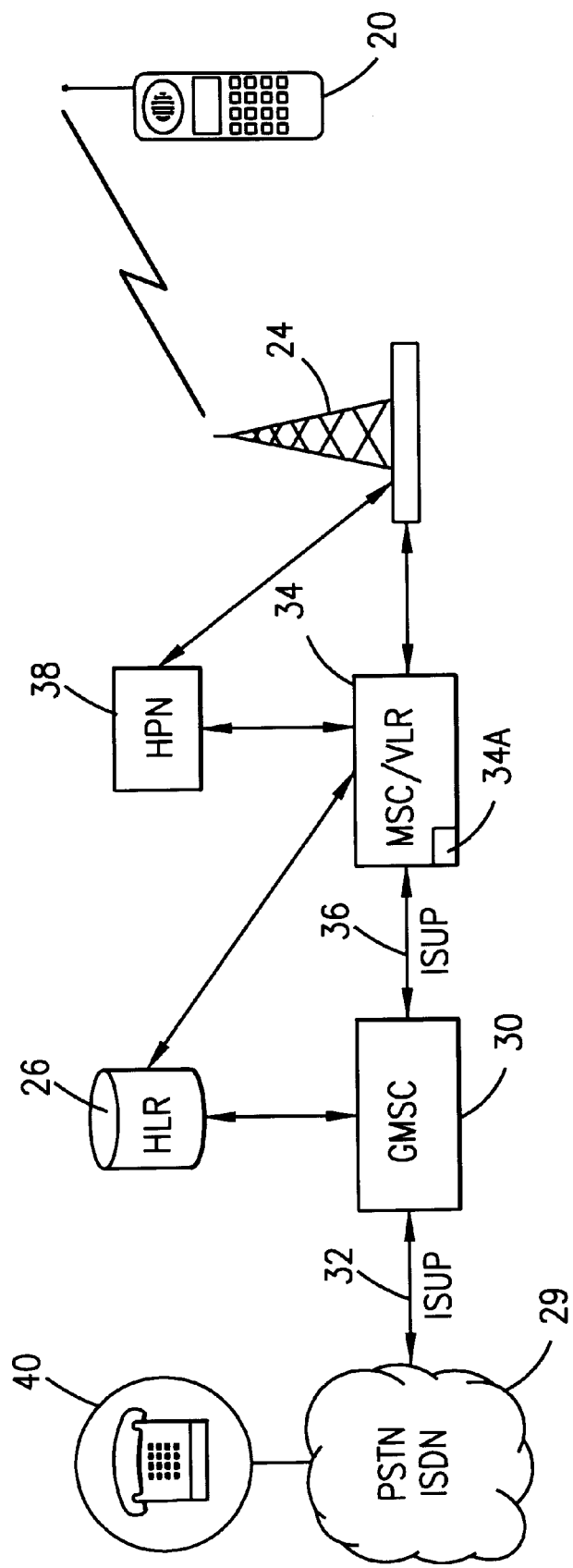
FIG. 2 is another diagram of the network system of FIG. 1, further illustrating the high penetration notification capability.

With reference now to FIG. 2, there is illustrated another view of the telecommunications system configuration shown in FIG. 1. In particular, a conventional Public Switched Telephone Network (PSTN)/Integrated Services Digital Network (SDN) 29 is shown communicating with a gateway MSC (GMSC) 30, which acts as a communication gateway between the cellular network and the outside (PSTN), across a wireline link 32 via, for example, ISDN User Part (ISUP)

or Broadband ISUP (BISUP) protocols. It should be understood that the aforementioned ISUP (and BISUP) protocols may be utilized in coordinating the voice and data calls between the external PSTN/ISDN 29 and GMSC 30.

The GMSC in FIG. 2 is also shown in communication with the aforedescribed HLR 26 and an MSC/VLR 34, such as the MSC 14 and VLR 16 combinations shown in FIG. 1. Another wireline communications link 36, adhering to the same ISUP protocols described in connection with link 32, allows the exchange of voice and data between the GMSC 30 and the MSC/VLR 34 through the establishment of a trunked connection therebetween. The MSC/VLR 34, in turn, communicates directly with at least one BS 24, as described in connection with FIG. 1, and an HPN node 38, as described in said co-pending patent application. The mobile subscriber terminal 20 may therefore wirelessly communicate with a remote PSTN user terminal 40 across the aforesaid linkages once a call connection has been established. A Short Message Service (SMS) message may also be forwarded by the remote terminal 40 to the mobile terminal 20.

Figure 3:
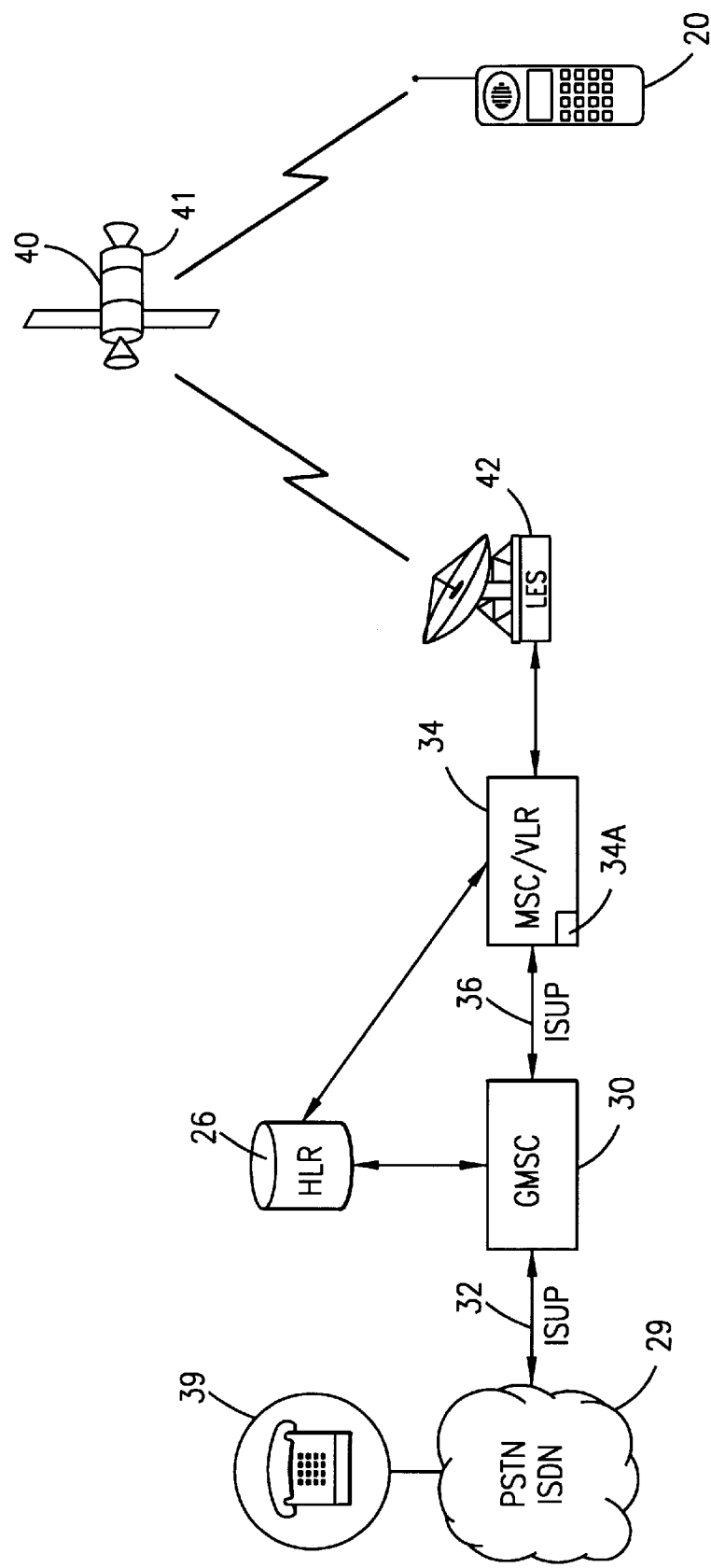
FIG. 3 is a block diagram of a satellite-based communications network such as may be employed in the present invention, also including high penetration notification capability.

With reference now to FIG. 3, there is illustrated a satellite-based telecommunication system, similar to the terrestrially-based cellular system in FIG. 2, in which the mobile terminal 20 communicates with the MSC/VLR 34 via a satellite 40. Instead of using the terrestrially-based base stations 24, however, the system shown in FIG. 3 employs a Land-Earth Station (LES) 42 to communicate with the satellite 40 (and the mobile terminals 20 in communication therewith). As is understood in the art and as set forth in more detail in said co-pending application, satellite 40 is also able to perform pages to terrestrially-based mobile terminals 20 within the range (or subranges thereof) of said satellite 40 or within the aforedescribed PLMNs 10. The MSC/VLR 34 communicates with the HLR 26 and the GMSC 30 (via the ISUP link 36), which completes the connection to the PSTN/ISDN 28 (via the ISUP link 32). In this manner, a call (or SMS data) may be sent by the remote terminal 40 user to the MSC/VLR 34, across the LES 42, via satellite 40, to the MT 20, who may respond accordingly. As with the terrestrially-based configuration shown in FIG. 2, a trunked line connection (ISUP) from the GMSC 34 and the MSC/VLR 34, as shown in the figures, is necessary to complete the calls in either system.

In both cellular systems, e.g., the PLMNs 10, and in satellite-based systems, the signal link margins or effective signal strength from the base stations 24 and satellites 40, respectively, may not have enough power for the mobile terminal 20 to detect the transmission. Through high penetration notification (HPN), however, the terminal 20 can "hear" a notification at a higher power level. For example, an HPN subscriber in the system shown in FIG. 2 may receive the HPN message via HPN node 28 in the MSC/VLR 34 or the HPN subscriber in the satellite system shown in FIG. 3 may, via an HPN node 41 within the satellite 40, receive the HPN message. This high-power page request, albeit short in duration to conserve base station 24 or satellite 40 power, can nonetheless carry information therein, e.g., part of a Short Message, the Calling Party number for terminating calls, etc., as discussed in more detail in co-pending patent application.

It should be understood that the implementation of HPN into either the cellular (FIG. 1) or satellite (FIG. 2) system contexts results in various scenarios for terminating calls or short messages. For example, when a short message arrives at the MSC/VLR 34, there are three situations to consider. In the first, the mobile terminal 20 is both a subscriber to the pertinent system and is currently available, i.e., marked attached, for communication. In this scenario, the subscriber, being available, responds to the system page and HPN is not invoked. Where the subscriber is marked attached but does not respond to the page, HPN may, for example, be invoked if the system subscriber has subscribed to the HPN feature or if the switch settings allow HPN in that instance. Where, however, the subscriber is marked detached from the system, HPN may, as above, nonetheless be invoked in current systems if the subscription or settings permit it. No attempt, in this instance, is made to page.

The procedure for triggering HPN for terminating calls is similar to the short message service above, except, of course, in that the initial stimulus is a call coming into the network, e.g., from the phone 40. With particular reference now to FIGS. 2 and 3 and to the aforementioned co-pending patent application, steps performed in so implementing HPN for terminating calls are now described. First, an incoming call from the phone 40 through the PSTN/ISDN 28 enters the GMSC 30 across ISUP link 32. As discussed, the GMSC 30 acts as the gateway into the respective system considered, i.e., cellular or satellite.

The GMSC 30 in either system, after receiving the incoming call or message, sends various information to the HLR 26 to ascertain how to route the call, e.g., in a Send Routing Information command pursuant to Mobile Application Part (MAP) protocols such as within GSM. It should be understood that in the instant example the incoming call is directed to a subscriber. The HLR 26 then determines the particular MSC/VLR 34 handling that subscriber and forwards a roaming number request, e.g., a Provide Roaming Number command pursuant to MAP protocols, to that MSC/VLR 34, which returns the appropriate roaming number therein associated with that subscriber. The HLR 26, in turn, forwards the roaming number to the GMSC 30. As discussed, where the subscriber is attached, the GMSC 30 sets up a trunked (ISUP) call, which goes through to the MSC/VLR 34 and then on to the respective base station 24 and LES 42 (via satellite 40). The aforedescribed paging procedure is then performed pursuant to the paging response/attach marking corresponding to that subscriber to complete the connection to the MTs 20.

If escalation is then required, i.e., the subscriber fails to respond to the page and the aforementioned HPN methods set forth in the co-pending patent application are used, calling party information is extracted from the trunk and sent to the called person receiving the HPN, i.e., the mobile terminal 20 user. One disadvantage of the procedure set forth in the co-pending patent application and used in the systems shown in FIGS. 2 and 3 is that the MSC/VLR 34, when asked by the HLR 26 to provide a roaming number, ignores the subscriber's status, i.e., whether they are attached or detached, "overrides" a possible detached marking and returns the roaming number to the HLR 26 anyway. If the MSC/VLR 34 operates normally in this instance, however, no call will be set up to it and the calling party identity is not delivered.

A consequence of such detached marking overrides is that some supplementary services, e.g., call divert on unreachable, are triggered later in the call then in normal operation, i.e., they are triggered in the MSC/VLR 34 instead of the HLR 26. Furthermore, triggering such services in the MSC/VLR 34 may also cause "tromboning" if the call is routed back to a voice message system that was reachable from the GMSC 30.

More seriously, even though a subscriber may be marked as detached from the system, such as described in the aforesaid co-pending patent application, it is nonetheless still necessary that a trunked line 36 connection be made between the GMSC 30 and the respective MSC/VLR 34, through the aforementioned ISUP connection, merely to deliver the calling party identity to the MSC/VLR 34. Although the trunked line 36 is seized for only a brief period of time, e.g., about 2 seconds or enough time for the GMSC 30 to transfer the calling party identification to the MSC/VLR 34, it is nonetheless a wasteful consumption of system resources when the indicated user is detached from the system. As discussed hereinbefore, the present invention is directed to improvements in the HPN protocol set forth in the co-pending patent application which facilitate communications between the GMSC 30 and MSC/VLR 34, particularly through the HLR 26, whereby a trunked line 36 connection is not automatically invoked or required when the called user MT 20 is detached.

Through modifications of the above systems and procedures, the inefficiencies of the previous techniques are overcome and the advantages of the present invention are attained. One modification is to provide the calling party information, previously forwarded only along the established trunk line 36 connection, to both the Send Routing Information and Provide Roaming Number commands, the first utilized by the GMSC 30 to request routing information from the HLR 26 and the latter used by the HLR 26 to request the roaming number from the particular MSC/VLR 34. Accordingly, via existing networking signaling and MAP protocols, the aforementioned calling party information is delivered to the MSC/VLR 34. It should be understood that in the Global System for Mobile (GSM) communications system, the established extension areas of existing messages may be employed for the transportation of this information.

Accordingly, through the aforedescribed modifications, no additional messages are needed and no trunk line 36 connection is required for the aforedescribed detached case. It should be understood, however, that the calling party information includes not only the calling party number, but also the Nature of Address and presentation information. In this way, the same decisions can be made, e.g., by the particular MSC/VLR 34, regarding the presentation of the calling party number as if the number had been delivered by ISUP.

An additional modification is within the MSC/VLR 34, which now triggers off of the roaming number request (Provide Roaming Number) instead of the conventional ISUP connection. When the MSC/VLR 34 in the present invention receives the roaming number request, via MAP, it checks a detached flag database 34A therein, as shown in FIG. 2. If the indicated subscriber flag within that database 34A is attached, i.e., the flag has a normal (zero) value, the MSC/VLR 34 returns the roaming number in the normal fashion. If a particular detached flag is set (one), however, this indicates that the subscriber is not available, i.e., detached. The MSC/VLR 34 then checks for other triggering criteria, e.g., that the particular subscriber has a subscription to HPN, that certain International Mobile Station Identification (IMSI) numbers or number series should automatically receive HPN or that all subscribers should have access to HPN. In any event, if the particular criteria are satisfied, the MSC/VLR 34 triggers the HPN procedure, as discussed, and returns to the HLR 26 the same response that it would have sent under the detached marking for any subscriber. For example, the MSC/VLR 34 could send back the detached marking directly enabling immediate invocation of "unreachable" supplementary services.

It should, therefore, be understood that establishment of the aforementioned trunk connection is now optional for those calls doomed to fail and is no longer required merely to deliver the calling party identification, as utilized in conventional systems and in that of said co-pending patent application.

It should be understood that another advantage in forwarding the calling party information, e.g., the caller's phone number, to the MT 20 is that the information can be stored within or displayed on the MT 20. Accordingly, the user, e.g., an HPN subscriber, has the necessary information to contact the caller without the seizure of the aforementioned trunked connection.

It should also be understood that the aforedescribed methodology may be employed not only where the caller is external to said system, i.e., through the PSTN/ISDN 28, but also where the calling party is within the system, i.e., a subscriber in another MSC/VLR 34, which it should be further understood serves as the GMSC 30.

It should further be understood that although the presently preferred embodiment of the present invention is to improve HPN operations by forwarding the calling party information without trunking, the principles set forth herein may be used in any other context where caller information or messages need be forwarded without engaging trunking resources. It should also be understood that the information transferred through HPN or other operations, may include additional or other information, such as used in SMS operations.

It should also be understood that the attached/detached database 34A stored in the MSC/VLR 34 includes a plurality of connection status flags associated with the corresponding plurality of mobile terminals associated with that MSC/VLR 34. Each flag may constitute 1-2 bits and represent two types of detachments, e.g., an implicit detachment where the MT 20 must reregister within a system defined period or also be marked (flagged) detached and/or an explicit detach where the MT 20 has powered down.

The previous description is of a preferred embodiment and alternatives for implementing the invention, and the scope of the invention should not necessarily be limited by this description. The scope of the present invention is instead defined by the following claims.

What is claimed is:

1. In a telecommunications system communicating with a plurality of mobile terminals, a calling party attempting to contact a respective one of said mobile terminals, circuitry within said system for forwarding caller information to said one mobile terminal, said circuitry comprising:

a gateway mobile switching center for receiving a message from said calling party, said gateway mobile switching center upon receiving said message from said calling party forwarding a first routing information request to a home location register associated with said system;

a mobile switching center associated with said one mobile terminal, said home location register upon receiving said first routing information request forwarding a second routing information request to said mobile switching center, said first and second routing information requests including said caller information therein; and an attached/detached database, within said mobile switching center, said database comprising a plurality of connection status flags associated with a corresponding plurality of said mobile terminals associated with said mobile switching center, said plurality of mobile terminals including said one mobile terminal, whereby, when said connection status flag associated with said one mobile terminal indicates said one mobile terminal is detached from said mobile switching center, said caller information is transmitted to said one mobile terminal.

2. The system according to claim 1, further comprising:
a high penetration notification node, in communication with said mobile switching center.

3. The system according to claim 2, wherein said high penetration node is attached to said mobile switching center.

4. The system according to claim 2, wherein said high penetration node is attached to a satellite in communication with said mobile switching center and said mobile terminal.

5. The system according to claim 2, wherein said node is invoked if said one mobile terminal user is a high penetration node subscriber.

6. The system according to claim 2, wherein said node is invoked if the load on said mobile switching center is below a given threshold.

7. The system according to claim 1, wherein said first and second routing information requests are in Mobile Application Part protocol.

8. The system according to claim 7, wherein said first routing information request to said home location register is a Send Routing Information command.

9. The system according to claim 7, wherein said second routing information request to said mobile switching center is a Provide Roaming Number command.

10. The system according to claim 1, wherein each of said connection status flags in said database is a Boolean value, where said flag associated with said one mobile terminal is set when said one mobile terminal is detached from said mobile switching center.

11. The system according to claim 1, wherein each of said connection status flags in said database is a 2 bit value.

12. The system according to claim 11, wherein said flag includes an implicit detachment flag therein.

13. The system according to claim 11, wherein said flag includes an explicit detachment flag therein.

14. The system according to claim 1, further comprising:
a display means, attached to said one mobile terminal, for displaying said caller information thereon.

15. The system according to claim 14, wherein said caller information includes a return telephone number associated with said calling party.

16. The system according to claim 1, further comprising a storage means, within said one mobile terminal, for storing said caller information therein.

17. The system according to claim 16, wherein said caller information includes a return telephone number associated with said calling party.

18. A method for forwarding calling party information to a mobile terminal within a telecommunications system, said system including a gateway mobile switching center, a mobile switching center having an attached/detached database therein, and a home location register, said mobile switching center being associated with said mobile terminal, said method comprising the steps of:

(a) receiving said calling party information at said gateway mobile switching center;

(b) sending, from said gateway mobile switching center to said home location register, a first routing information request, said first routing information request including said calling party information therein;

(c) receiving, at said home location register, said first routing information request, and sending, to said mobile switching center associated with said mobile terminal, a second routing information request, said second routing information request including said calling party information therein;

(d) retrieving, within said attach/detach database within said mobile switching center, a connection status flag value associated with said mobile terminal; and (e) transmitting, from said mobile switching center to said mobile terminal, a signal including said calling party information therein, whereby said mobile terminal receives said calling party information.

19. The method according to claim 18, wherein said signal is a high penetration notification signal.

20. The method according to claim 18, wherein said step of transmitting comprises:
transmitting said signal from said mobile switching center to a satellite and from said satellite to said mobile terminal.

21. The method according to claim 18, wherein said first and second routing information requests are in Mobile Application Part protocol.

22. The method according to claim 21, wherein said first routing information request to said home location register is a Send Routing Information command.

23. The method according to claim 21, wherein said second routing information request to said mobile switching center is a Provide Roaming Number command.

24. The method according to claim 18, further comprising the step of:
displaying, at said mobile terminal, said calling party information.

25. The method according to claim 24, wherein said calling party information includes a return telephone number associated with said calling party.

26. The method according to claim 18, further comprising the step of:
storing, within said mobile terminal, said calling party information.

27. The method according to claim 26, wherein said calling party information includes a return telephone number associated with said calling party.

* * * * *